No. 12,763. REISSUED MAR. 17, 1908.

C. E. BROWN & W. J. GIBBS.

WOOD TRIMMING MACHINE.

APPLICATION FILED FEB. 13, 1908.

3 SHEETS—SHEET 1.

Witnesses:

H. M. Stump

A. Gruber

Inventors:

C. E. Brown & W. J. Gibbs by C. F. Wieland

Attorney

THE NORRIS PETERS CO., WASHINGTON, D. C.

No. 12,763. REISSUED MAR. 17, 1908.

C. E. BROWN & W. J. GIBBS.

WOOD TRIMMING MACHINE.

APPLICATION FILED FEB. 13, 1908.

3 SHEETS—SHEET 2.

Witnesses:
T. M. Stump
A. Gruber

Inventors
C. E. Brown & W. Gibbs
by
J. J. Dollavent
their attorney.

THE NORRIS PETERS CO., WASHINGTON, D. C.

No. 12,763. REISSUED MAR. 17, 1908.

C. E. BROWN & W. J. GIBBS.

WOOD TRIMMING MACHINE.

APPLICATION FILED FEB. 13, 1908.

3 SHEETS—SHEET 3.

Witnesses:
F. M. Stump
A. Guber.

Inventors,
C. E. Brown & W. J. Gibbs
by G. F. Ottaudet
their Attorney.

THE NORRIS PETERS CO., WASHINGTON, D. C.

UNITED STATES PATENT OFFICE.

CLAUDE E. BROWN AND WILLIAM J. GIBBS, OF DENVER, COLORADO.

WOOD-TRIMMING MACHINE.

No. 12,763. Specification of Reissued Letters Patent. Reissued March 17, 1908.

Original No. 873,837, dated December 17, 1907, Serial No. 368,977. Application for reissue filed February 13, 1908. Serial No. 415,788.

*To all whom it may concern:*

Be it known that we, CLAUDE E. BROWN and WILLIAM J. GIBBS, citizens of Denver, in the county of Denver and State of Colorado, have invented certain new and useful Improvements in Wood-Trimming Machines, of which the following is a specification.

Our invention relates to certain new and useful improvements in wood trimming machines and more particularly in the class of machines comprising one or more knives which have a reciprocating movement in relation to a bed upon which the stock to be trimmed is disposed.

The objects of our invention are to provide a machine of the class named which combines simplicity of construction with great power and efficiency in action, which may be employed to cut the stock disposed upon its bed, at any desired angle in relation to its altitudinal surfaces as well as to its upper or lower surfaces, which has adequate means to readily and accurately adjust the stock to the desired angle relative to the plane of travel of the knives, which may be used to cut stock of large dimensions, and in which the arrangement of the knives obviates the use of guides to prevent splitting of the wood while being driven therethrough.

Figure 1:
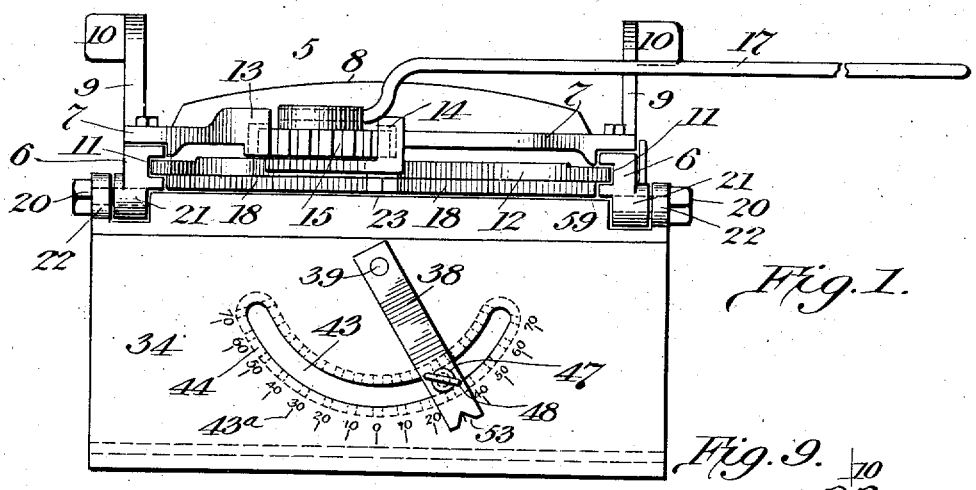
Figure 2:
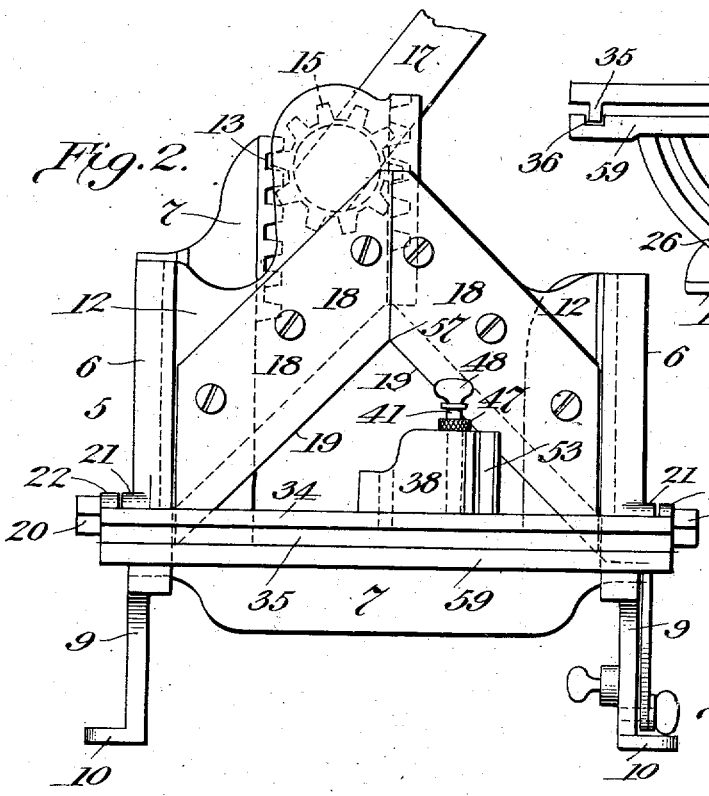
Figure 9:
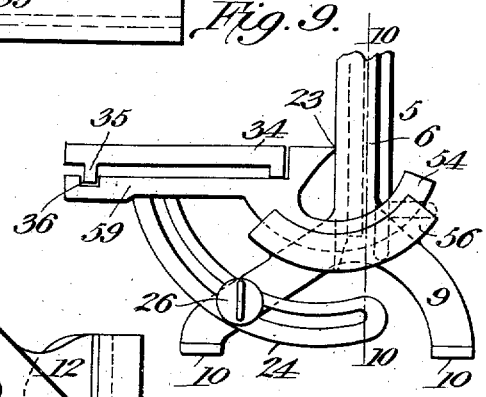
Figure 10:
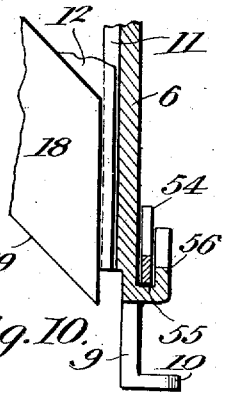
Figure 4:
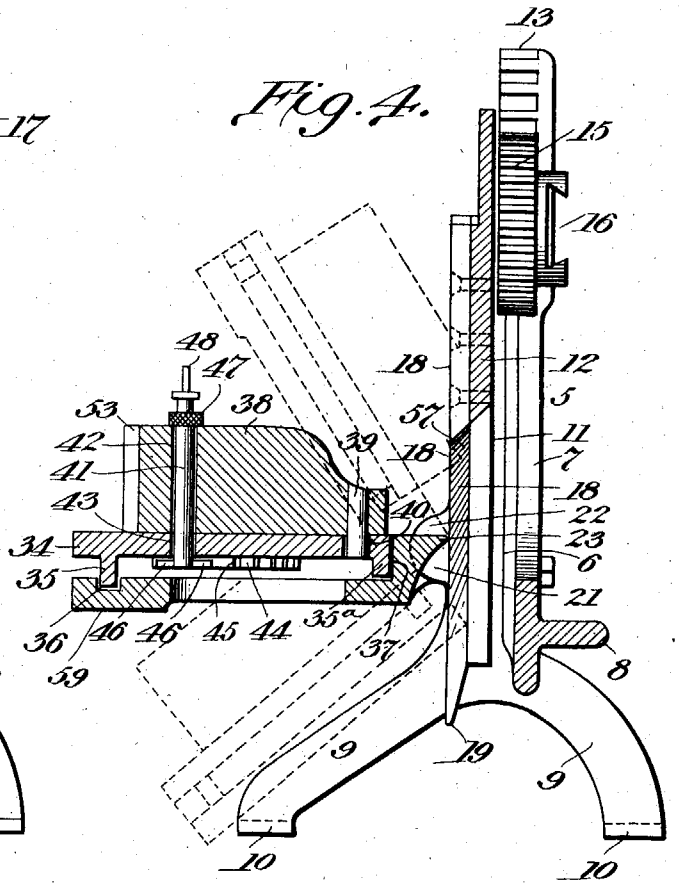
Figure 3:
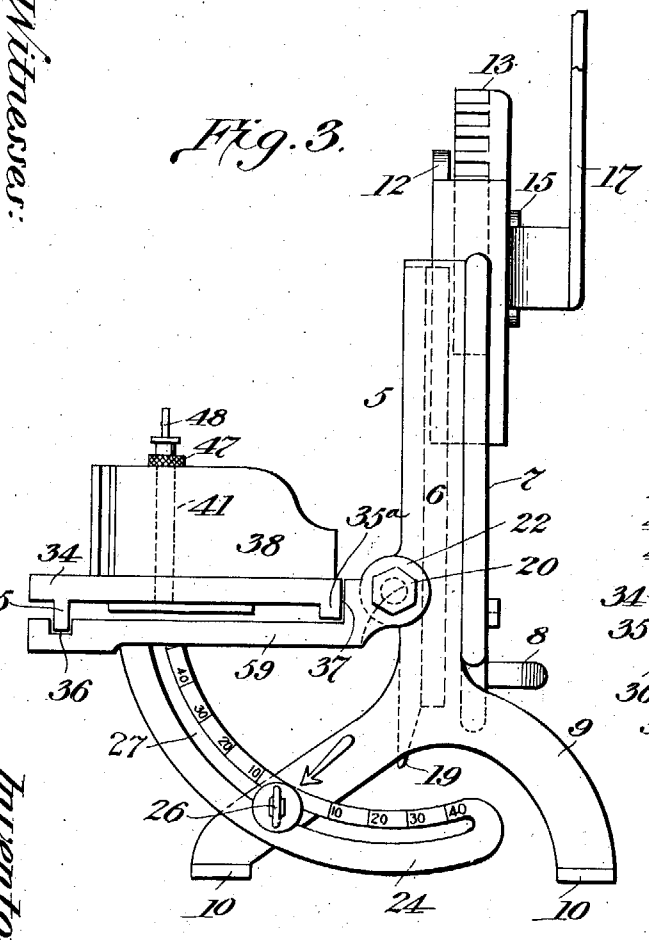
Figure 5:
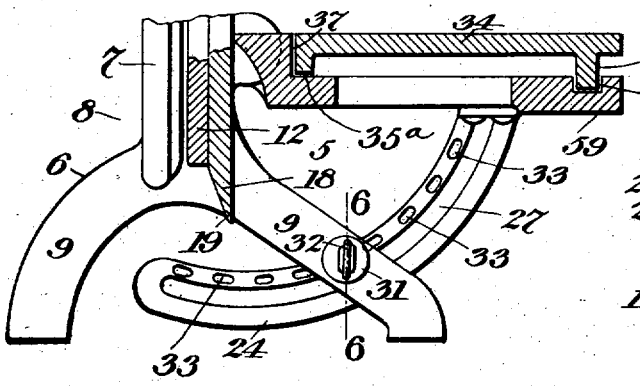
Figure 6:
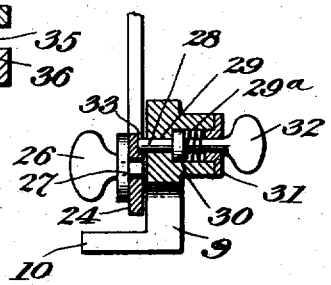
Figure 7:
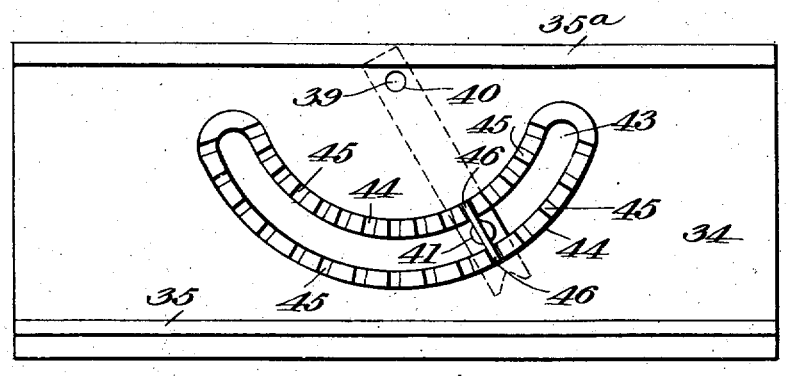
Figure 8:
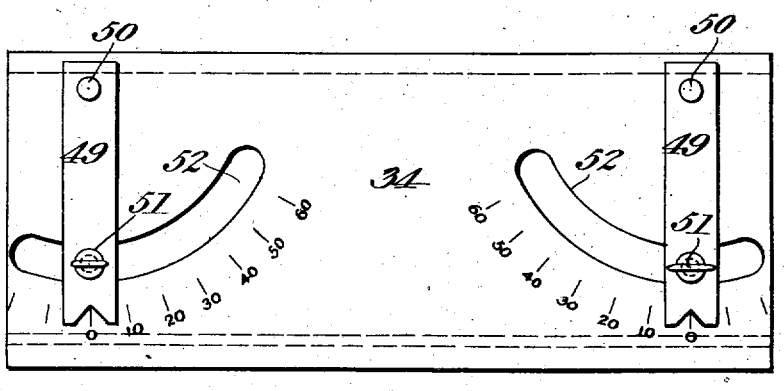

We attain our objects by the mechanism illustrated in the accompanying drawings in the various views of which like parts are similarly designated and in which Figure 1—represents a plan view of our improved machine, Fig. 2—a front elevation thereof, Fig. 3—a side elevation drawn to an enlarged scale, Fig. 4—an enlarged, central, vertical, transverse section through the device, the bed and sliding table having been shown in three positions, Fig. 5—a fragmentary transverse section of the lower part of the machine looking in the direction of the segmental bed gage, Fig. 6—a section taken along a line 6—6, Fig. 5, Fig. 7—an underneath view of the slidable table, Fig. 8—a plan view of the table illustrating a modified arrangement of the angle gages, Fig. 9—a fragmentary side elevation of the lower part of the machine, drawn to a reduced scale, showing a modified manner of supporting the bed upon the stationary frame, and Fig. 10—a vertical, sectional view taken along a line 10—10, Fig. 9.

Referring to the drawings the reference character 5 indicates the stationary frame, composed of two vertical standards or uprights 6 and the connecting U-shaped plate 7 the lower portion of which is reinforced by a laterally extending rib 8.

The standards 6, whose lower, bifurcated extremities 9 terminate in outwardly ranging feet 10, are provided at their opposite, inner faces with vertical channels 11 which form guide ways for the reciprocating knife frame 12.

The connecting plate 7 and the knife frame 12 are respectively provided with integral, oppositely positioned racks 13 and 14 into which meshes the interposed pinion 15, formed at its rear face with a dove-tailed channel 16 for the reception of the correspondingly shaped extremity of an operating handle or lever 17. The pitch line of the rack 14 lies in a plane with the vertical axis of the knife carrier so that the power applied through instrumentality of the pinion, is evenly distributed and equability and ease of motion of the reciprocating parts are assured.

Secured upon the outer face of the frame 12 intermediate the standards, are the angularly arranged knives 18, the cutting edges 19 of which compose an upwardly pointing angle, the apex of which lies in the vertical center line of the carrier. It should be observed that, although for ease in manufacture it is desirable to employ two knives, the cutting edges may be formed upon a single V-shaped plate.

The reference numeral 59 designates the bed employed to support the stock in proper relation to the knives and which is pivotally connected with the standards 9 by means of pivot bolts 20 disposed in registering apertures in lugs 21 and 22 which project in contiguous relation respectively from the standards and the bed plate. The inner or shearing edge 23 of the latter extends in close proximity to the surface of the knives 18 and in alinement with the axes of the two pivots 20 of the bed so that the distance between the said edge and the knives will be uniform irrespective of the position of the bed plate in relation to the stationary frame. The bed 59 is furthermore provided at one of its sides, with a downwardly ranging slotted, segmental gage 24, the arc of which is described from a center point lying in the pivotal axis of the bed and which has upon its outer face, a series of graduations which by registration with a fixed point 25 upon the leg 9 of the standard 6, in adjacency to which the segment extends, aids in determining in degrees, the angle between the bed plate and the vertical plane of travel of the knives.

The gage 24 and the therewith connected bed plate may be retained in any desired position by the use of a thumb screw 26, which extending through the slot 27 in the former, projects into a coöperatively threaded aperture in the adjacent leg of the standard. The adjustment of the bed plate to the desired angles is greatly facilitated by the employment of a pin 28, which projecting through a corresponding opening 29 in the leg 9, is arranged to enter any one of a plurality of indentations 33 arranged on the inner surface of the segment, in relation to the graduations upon its opposite face. The pin 28 is held resiliently in engagement with the segmental arm by means of a spring 29[a], disposed in an enlarged part of the opening 29 in engagement with a collar 30 upon the pin and a cap 31 employed to close the opening. A head 32 facilitates the withdrawal of the bolt from the indentations, 33, which are preferably made oblong in shape in order to allow for a slight adjustment of the bed plate after it has been placed at the desired angle to the knives.

Slidably mounted upon the upper surface of the bed plate is a table 34 provided upon its lower surface, with two parallel longitudinal ribs 35 and 35[a], the outer one 35 of which is seated within a correspondingly formed guide groove 36, while the other 35[a] extending along the inner edge of the table, engages an offset 37 on the bed.

A gage 38 is pivotally mounted upon the sliding table in central relation thereto, by means of a pivot pin 39 which projects into a corresponding opening 40 in proximity to the inner edge of the table. The gage may be retained in any of a plurality of predetermined positions, by means of a bolt 41 which occupies a vertical bore 42 in its outer portion and whose lower extremity projects through an arcual slot 43 in the table, described from a center lying in the pivotal axis of the gage. The table is furthermore provided upon its upper surface, with a graduated scale 43[a] concentric to the guide slot 43, and upon its lower surface with a ridge 44, which bounding the slot 43, has a plurality of notches 45, the center lines of which extend respectively in planes with the radii of the graduations on the above mentioned scale. Lateral projections 46 on the lower extremity of the bolt 41, are adapted to occupy the notches 45 and a nut 47 upon its upper threaded extremity, in engagement with the upper edge of the gage, retains the said projections in their adjusted position. A thumb piece 48 applied to the end of the bolt projecting above the nut 47, facilitates the adjustment of the projections 46 in the notches 45.

The gage 38 is provided with suitable indicatory means such as a V shaped notch 53 which by registration with the graduations of the scale 43[a], denotes the angle to which the gage is adjusted.

The sliding table may, if so desired, be provided with two gages instead of the above described central one, as is illustrated in Fig. 8 of the drawings, in which the reference character 49 designates the gages pivoted at 50 near the side edges of the table, and 51 the bolts at the outer ends of the gages which project through slots 52 in the table.

Figs. 9 and 10 represent a manner of supporting the bed of the device, different from that hereinbefore described and particularly adapted for use on large and heavy machines. The lugs 21 and 22 and the cap screws 20 are in this case omitted and the bed 59 provided with two rearwardly ranging, segmental arms 54, the centers of the arcs of which lie in a line with the shearing edge 23. The arms 54 occupy correspondingly shaped segmental seats 55 produced by flanges 56 on the standards 6 and the bed is held in its adjusted position through instrumentality of the slotted segmental gage 24 which in this case is concentric to the arms 54 and the seats 55.

The operation of the machine will be readily understood in connection with the foregoing description.

The piece of stock having been placed upon the table 34, the latter is moved upon the supporting bed 59 until the portion of the stock which is to be cut occupies a position substantially opposite the apex 57 of the cutting edges 19 of the knives. If it is desired to cut the wood at a given angle to its upper or lower surface, the bed 59 is adjusted by means of the graduated segmental gage 24 to form a similar angle with the vertical plane, which adjustment is greatly facilitated and readily and accurately accomplished by the use of the spring dog 28 arranged to project into the indentations 33 of the gage. Should it be desired to cut the piece of stock along a plane at a certain angle to its altitudinal faces, its position is adjusted to the desired angle, by placing it against the pivotal gage 38 and positioning the latter so that its indicatory notch 53 registers with the proper graduation on the scale 43[a] which, as hereinbefore described, may be speedily accomplished by adjustment of the bolt 41 in respect to the notches in the ridges 44.

It is obvious that the machine may be employed to cut the wood synchronously at angles to its lower and to its altitudinal surfaces by simultaneous adjustment of the position of the bed and of the gage 38.

The carriage 12 having been raised, the end of the adjusted piece of stock is projected in the path of the cutting edges 19 and the knives driven downwardly by manipulation of the operating lever 17. The force with which the knife carriage descends is augmented by its weight while the central position of its rack prevents binding of its edges in the vertical guide ways and assures even distribution of the applied force over the cutting edges of the knives. The simultaneous engagement of the latter with the stock not only facilitates the cutting process, but furthermore tends to firmly retain the piece in its adjusted position and to prevent splitting of the wood.

An additional advantage of the arrangement of the parts of our machine consists in the fact that the racks and pinion are at all times above the cutting edges of the knives so that chips and shavings can not interfere with their operation.

Having thus described our invention what we claim and desire to secure by Letters Patent is:—

1. In a wood trimming machine, in combination a vertically reciprocating, plane knife having two cutting edges extending from its vertical edges upwardly to a central point of intersection, a bed having a shearing edge in coöperative proximity to the said knife and movable about a horizontal axis, and a table upon the said bed movable in parallel relation to the knife.

2. In a wood trimming machine, in combination, a vertically reciprocating, plane knife having two cutting edges extending from its vertical edges upwardly to a central point of intersection, a bed having a shearing edge in coöperative proximity to the said knife and movable about a horizontal axis, a table upon the said bed movable in parallel relation to the knife, a gage upon the said table movable about an axis at right angles to its upper surface, and means to hold the said gage in its adjusted position.

3. In a wood trimming machine, in combination a vertically reciprocating, plane knife having two cutting edges extending from its vertical edges upwardly to a central point of intersection, a bed having a shearing edge in coöperative proximity to the said knife and movable about a horizontal axis, a table upon the said bed movable in parallel relation to the knife, means connected with the bed to measure the angle between its upper surface and the face of the knife, a gage upon the table movable about an axis at right angles to its upper surface, and means upon the table to measure the angle between the said gage and a plane passing through its pivotal axis.

In testimony whereof we have affixed our signatures in presence of two witnesses.

CLAUDE E. BROWN.
WILLIAM J. GIBBS.

Witnesses:
G. J. Rollandet,
K. M. Stump.